F. MÜLLER.
CASH CONTROLLING APPARATUS.
APPLICATION FILED JULY 26, 1910.
1,094,586. Patented Apr. 28, 1914.
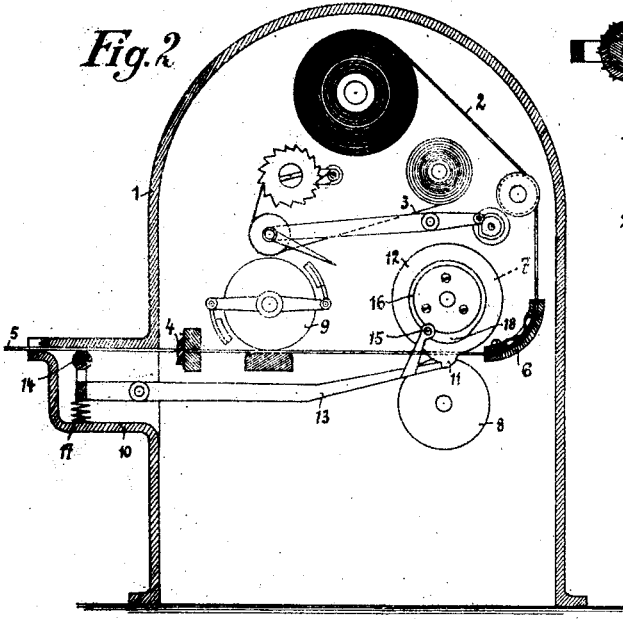
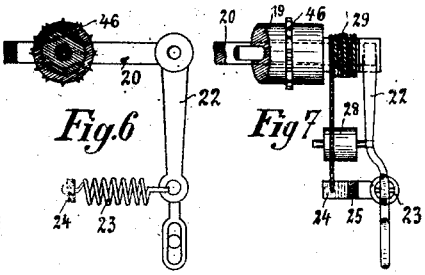
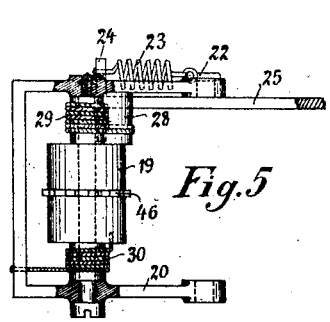
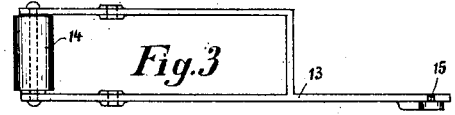
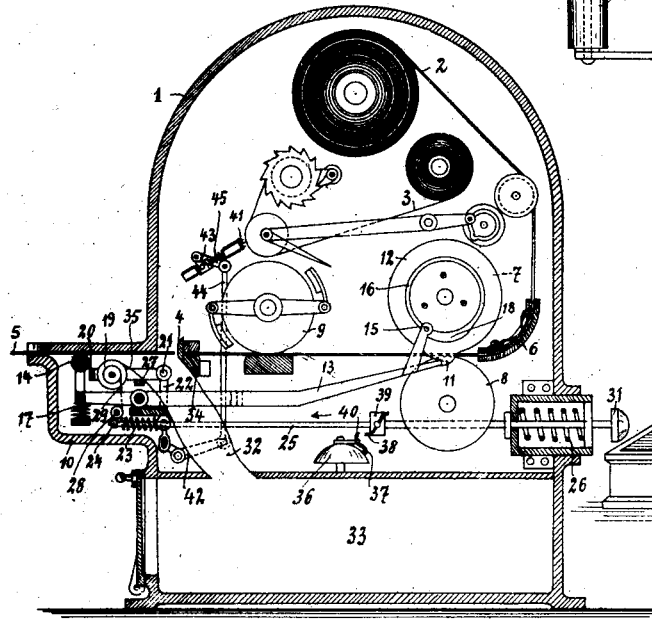
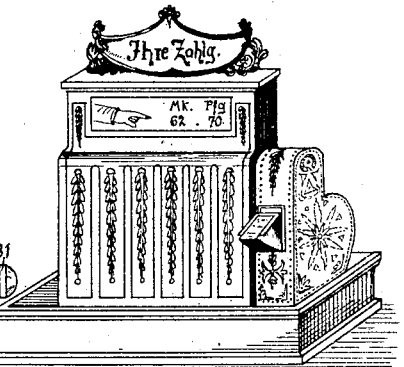
Witnesses:
Inventor:
Friedrich Müller.

UNITED STATES PATENT OFFICE.

FRIEDRICH MÜLLER, OF BOCHUM, GERMANY, ASSIGNOR TO THE NATIONAL CASH REGISTER COMPANY, OF DAYTON, OHIO, A CORPORATION OF OHIO, (INCORPORATED IN 1906.)

CASH-CONTROLLING APPARATUS.

1,094,586.    Specification of Letters Patent.    Patented Apr. 28, 1914.

Application filed July 26, 1910. Serial No. 573,953.

*To all whom it may concern:*

Be it known that I, FRIEDRICH MÜLLER, a subject of the German Emperor, and resident of Bochum, Germany, have invented certain new and useful Improvements in Cash-Controlling Apparatus, of which the following is a specification.

The present invention relates to cash registers and has more particular relation to that class of registers which are adapted to record transactions as they occur in retail stores and to make a detail printed record of each transaction.

The present invention is capable of embodiment in various forms, but in its present embodiment as illustrated is applied to a machine of the type shown in Letters Patent of the United States No. 765,767, issued July 26, 1904, to Thomas Carroll. As shown in said patent, that type of machine is arranged to print a detail record of each transaction simultaneous with the registration of the amount of the transaction upon the usual totalizer and also to issue a printed check or slip bearing a complete and detailed record of the transaction.

In the use of machines of the above type the check which is issued by the register is adapted either to be given to the customer as a receipt in a case of cash transactions or in a case of other transactions such as "charge," "received on account" and "paid out" for the use of checking such transactions. In the use of registers of the above type it is customary to offer prizes to any customer who makes a cash purchase at the store using such register without receiving a receipt for the full amount paid. This system is employed in order to compel the clerk handling the transaction to make a complete and exact record of the same. In other uses, such as in "charge" or "received on account" transactions, the check is used in connection with the charge or account slips to indicate that the transaction has been correctly recorded upon the register.

It will readily be seen that in case a clerk neglects to turn over the check to a customer in the case of a cash transaction, or in the case of a "charge" or "received on account" transaction failed properly to file the same, it would result in considerable confusion and loss as no control would be had on the charge and received on account transactions.

It is the object of the present invention to provide means to compel the operator or clerk to take the check from the register as soon as it is issued and thereby remind him to dispose of it as the system in vogue requires.

A further object of the invention is to provide means for filing within the register any checks which the clerk fails to dispose of in the proper manner, and also to make a record of such checks.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a perspective view of a complete machine of the type to which the present improvements are shown as applied. Fig. 2 is a plan view of the printing mechanism for making a printed record of transactions, portions of the cabinet and mechanism being omitted for the sake of clearness. Fig. 3 is a detail view of parts shown in Fig. 2. Fig. 4 is a plan view of a printing mechanism for making printed records of transactions, together with all of the present improvements applied thereto. Figs. 5, 6 and 7 are detail views of mechanism shown in Fig. 4.

The form of printer which has been shown in the drawings is a form which is well known in the art and needs no particular description here. Reference, however, may be had to the United States Letters Patent above mentioned for a detail description of the printing mechanism. Briefly described, however, the operation of the machine shown in said Letters Patent is as follows: When the keys of the register are depressed to represent the transaction which is to be recorded, the operating handle is then operated to record the transaction. In recording such transaction a printed record thereof is made in the following manner: A series of printing type wheels 9 are provided and are differentially adjustable to represent the amount of the transaction being recorded. When the type wheels 9 are in their adjusted position a check strip 2 and detail strip 3 are brought into contact with the type wheels to cause an impression representing the sale recorded to be made on each of said strips. The detail strip is then fed forward a short distance to bring a new portion of said strip in printing position, and the check strip 2 is fed from a supply roll down through a chute 6, and thence between a pair of feed rolls 7 and 8. The check strip then passes beneath the printing type wheels 9 and forward above a knife 4 and into a check receiver 10 formed in the inclosing casing 1. When the check strip is fed out the proper distance the knife 4 is actuated to sever the portion 5 from the strip, which portion then forms the receipt which is to be handed to the customer or otherwise handled in accordance with the system in vogue.

It will readily be seen that it is possible for a clerk to record a transaction and then neglect to remove the check 5 from the receiver 10, which neglect may not be noticed for some time. However, with the use of the present improvements a clerk is compelled to remove the check 5 from the check receiver 10, or he will be unable again to operate the register until he has removed the check.

In order to compel the clerk to remove the check from the check receiver and also to prevent an operation of the register until the check is so removed, means are provided for locking the operating mechanism of the register while a check is allowed to remain in the receiver. Such means comprises a roller 14 carried by a frame 13 pivoted to the frame of the machine. A spring 17 is provided to hold the frame in normal position with the roller 14 pressing against the upper and inner wall of the receiver 10. When the frame is in that position the machine is free to be operated but as soon as the check 5 is fed into the receptacle and thus interposed between the wall of the receptacle and the roller 14, the frame 13 will be rocked about its pivot to bring its rear end into the path of a lug 11 formed on the periphery of a cam disk 12 carried by the feed roll 7 which is adapted to receive a complete rotation at each operation of the machine, as shown in the above mentioned United States Letters Patent. It will thus be seen that as long as the check is allowed to remain in the receptacle the rear end of the frame 13 will be in locking engagement with the disk 12 and the register cannot then be operated until the check is removed.

Cam 12 is formed with a groove 16 enlarged at 18, in which enlarged portion rests an anti-friction roller 15 carried by an upwardly extending arm on the rear end of the frame 13. When no check is in a receiver, the anti-friction roller 15 will rest on the lowermost edge of the enlarged portion 18 of groove 16 and the roller 14 on the forward end of the frame 13 will bear against the wall of the receiver 10. The disk 12 is then free to rotate and immediately upon the commencement of its rotation the narrow portion of the cam groove 16 will engage and elevate the anti-friction roller 15 and thus withdraw the roller 14 from contact with the wall of the receiver 10 in order to permit the feeding operation of the check 5. As the disk 12, however, reaches its normal position the roller 14 will again be allowed to move upward, but this time will bear against the check which is then in the receiver. The purpose of so rocking the frame 13 to carry the roller 14 away from the upper wall of the receiver 10 is to prevent a buckling of the check 5 which might otherwise occur if the tension of the spring 17 were of sufficient strength to prevent the paper being pushed in between the roller 14 and the wall of the receiver 10 in case the paper forming the check strip was not of sufficient weight.

In case the machine remains locked by a check being issued and allowed to remain in receptacle 10, means are further provided for withdrawing the check from the receiver 10 and depositing it in a locked receptacle 33 located just below the printing mechanism. This means may comprise a push button 3 carried on the outer end of a sliding bar 25 normally spring pressed outward to normal position by a spring 26 interposed between a portion of the casing and a collar carried by the bar 25. On the rear end of said bar is mounted a roller 24 to which is attached one end of a cord 29 which passes forwardly and is wound about a roller 28 on a spring wound drum 19.

The outer periphery of the drum 19 is formed with sharp teeth 46 which are adapted to engage with the check 5 to withdraw it into the machine in the following manner: The roller 19 is mounted in a frame 20, bell crank in form, and pivoted to the main frame at 21. A downwardly extending arm 22 of said frame 20 is pivotally connected to the bar 25 so that when said bar is forced rearwardly by pushing on the button 31, the frame 20 will be rocked about its pivot 21 to cause the teeth 46 of the drum 19 to engage the lower surface of the check 5. Simultaneous with the rocking of the frame 22 to cause the teeth 46 of roller 19 to engage the check 5, a rotating movement of the drum will be effected by the cord 29, which, as before stated, is wound about said drum and has one end fast to the forward end of the bar 25. When the bar is pushed inwardly, the cord will be unwound from the drums 19 and it will consequently be rotated in a direction to cause the check 5 to be fed forwardly through a passage 32 into a receptacle 33. To this end the side of the knife support 34 is beveled as shown, in order to deflect the check.

In order to indicate upon the detail strip 2 transactions for which no checks are removed from the machine, means are provided for punching a hole in the detail strip just beside the detailed record of such a transaction. This means comprises a sliding bar normally held out of contact with the detail strip 23 and carrying at its forward end a series of sharp points 41. The bar is adapted to be forced into contact with the record strip by a bell crank 43 pivoted to the frame of the machine and having one end pivotally connected to the sliding bar and its upper end pivotally connected to a link 44. The lower end of the link 44 is pivotally connected to one arm of a bell crank lever 42 pivoted to the frame of the machine. The other end of the bell crank carries a pin adapted to play in an elongated slot located at the lower end of the arm 22 of the rocking frame 20. It will thus be seen that when the push button 31 is forced inwardly to cause the drum 19 to engage and feed the check 5 forward into the machine, the rocking movement of the frame 20 rocks the bell crank 42 about its pivot, and, through the medium of the link 44, said rocking movement is transmitted to the bell crank 43 to slide the bar carrying the pins 41 into contact with the detail strip 3.

In order to sound a special alarm upon each operation of the push button 31, the bar 25 carries a block 39. Pivotally mounted on the block is a by-pass pawl 38 which is adapted to engage and operate a pivot lever 40 carrying a bell hammer 37 which is adapted to strike and sound the gong 36. It will thus be seen that upon each depression of the push button 31 to feed a check 5 into the machine, the by-pass pawl 38 will engage the upwardly extending arm of the hammer lever 40 and cause the hammer 37 to strike the gong 36 to sound an alarm.

No detailed description of the general operation of the machine is thought to be necessary, as it will readily be seen that as long as a check is allowed to remain in the receiver 10 the rear end of the frame 13 will be held in engagement with the lug 11 on the rotating disk 7. The machine will thus be locked against operation. As soon, however, as the check is removed from the receiver 10 the frame 13 will rock to disengage its rearward arm from the lug 11 and thus permit an operation of the machine. In order to facilitate the removing of the check from the receiver and also to record within the machine the fact that said check was fed back into the receptacle at the base of the printer, an operation of the push button 31 will then be effected. It will thus be seen that a check will at all times be either removed from the machine for the purpose of handing to a customer or filing of same in accordance with the system in vogue, or a record will be made to the effect that the check has been fed back into the machine. It will also readily be seen that such a device is capable of use in other connections, such, for instance, as permitting the customer to withdraw his receipt from the machine and to provide means for passing the check back into the machine in case the check is not so removed. It may further be used for soda fountains, or places of like nature. In that use the register may be placed at the cashier's desk and upon an amount of money being paid to the cashier for a certain amount of soda or other articles, a check will then be fed out toward the customer and the machine cannot again be operated until the customer has removed his check from the receiver.

While the form of mechanism herein shown and described is admirably adapted to fulfil the objects primarily stated, it is to be understood that it is not intended to confine the invention to the one form of embodiment herein shown and described as it is susceptible of embodiment in various forms, all coming within the scope of the claims which follow.

What is claimed is as follows:

1. In a machine of the class described, the combination with a check marking mechanism, and means preventing an operation of said mechanism while a previously marked check marked by the marking mechanism is allowed to remain in the machine.

2. In a machine of the class described, the combination with a check marking mechanism, of a check receiver for receiving a check when marked by the mechanism, and means for preventing an operation of said marking mechanism when a marked check is in the receiver.

3. In a machine of the class described, the combination with a check issuing mechanism, of a check receiver for receiving an issued check, and means for withdrawing the check from the receiver and depositing said check within the machine.

4. In a machine of the class described, the combination with a check issuing mechanism, of a check receiver for receiving an issued check, means for withdrawing the check from the receiver to deposit the same within the mechanism, and means for making a record of the withdrawal of the check.

5. In a machine of the class described, the combination with means for printing and issuing a check, of a check receiver for receiving the issued check, and means coöperating with said receiver for preventing a subsequent operation of the check means while the issued check is allowed to remain in the receiver.

6. In a machine of the class described, the combination with a casing and means therein for printing and issuing a check, of a check receiver for receiving the issued check, locking means coöperating with said receiver for preventing an operation of the check means while an issued check is allowed to remain in the receiver, and means for withdrawing the issued check from the receiver to deposit the same within the casing and making a record within the casing of such withdrawal.

7. In a machine of the class described, the combination with a casing, means therein for printing and retaining within the casing a detailed record of each transaction, and means for printing and issuing a check for each transaction, of a check receiver for receiving the issued checks, means coöperating with said receiver for preventing an operation of the check means while an issued check remains in the receiver, and means for withdrawing the issued check from the receiver to deposit the same within the casing and for recording the withdrawal of the check in connection with the detail record of the transaction to which it pertains.

8. In mechanism of the class described, the combination of check feeding and printing mechanism; of means for preventing an operation of said mechanism until the check printed on a previous operation has been removed from said mechanism.

9. In mechanism of the class described, the combination with a check printing and issuing cash register; of means for preventing an operation of the register until the check issued on a previous operation has been removed therefrom.

10. In mechanism of the class described, the combination of strip feeding mechanism; means for printing upon the strip and severing the printed portion of the strip; and means for preventing an operation of the above named means when a check issued on the previous operation has not been removed.

11. In mechanism of the class described, the combination of check issuing mechanism and locking means therefor rendered effective and retained in effective position by the check upon being issued and rendered ineffective by the removal of an issued check from the machine.

12. In mechanism of the class described, the combination of check issuing mechanism; of accessible means for receiving the checks as they are issued from the machine; and means for preventing an operation of said mechanism rendered effective by the presence of the check in the accessible means.

13. In mechanism of the class described, the combination of a check issuing mechanism; and means for locking said mechanism and retaining it in locking position by the issued check.

14. In mechanism of the class described, the combination of check marking and issuing mechanism and a lock therefor controlled by the issuance of a check from said mechanism.

15. In mechanism of the class described, the combination of check issuing mechanism; a normally ineffective lock therefor; and means whereby the lock is rendered effective and retained in effective position by a check issued from said mechanism.

16. In mechanism of the class described, the combination of a check issuing mechanism, operating means therefor, a receiver for issued checks; and a lock for the operating mechanism rendered effective by the presence of a check in the receiver.

17. In mechanism of the class described, the combination of check printing and issuing mechanism; a receiver for issued checks; and a lock for said mechanism effective at the end of an operation of the machine and rendered ineffective upon the removal of an issued check from the receiver.

18. In mechanism of the class described, the combination of check issuing mechanism; a locking lever therefor; means for holding the lever in locking relationship with the check issuing mechanism when the machine is being operated; means whereby the presence of an undisposed of check in the machine retains the machine locked when it is not being operated and means whereby the locking lever is moved to unlock the check issuing mechanism when an issued check is disposed of.

19. In mechanism of the class described, the combination of check issuing mechanism, of a locking lever therefor normally projecting into the path of an issued check to be moved thereby to lock the check issuing mechanism; and means for restoring the lever to normal unlocking position when the issued check is disposed of.

20. In mechanism of the class described, the combination of check issuing mechanism; of a receiver for temporarily receiving issued checks; a lock for the check issuing mechanism effective when an issued check is temporarily in its receiver; a second check receiver; and means for transferring an issued check from the first mentioned receiver to the second mentioned one to render ineffective the locking means for the check issuing mechanism and permitting another operation of the machine.

21. In mechanism of the class described, the combination of check printing and issuing mechanism; a temporary receiver for issued checks from which they can be manually removed; a lock for preventing the operation of the machine when an issued check is in the temporary receiver; a permanent receiver for unremoved checks; and mechanism for transferring an unremoved check from its temporary receiver to the permanent one, thereby rendering the lock ineffective and permitting another operation of the machine.

22. In mechanism of the class described, the combination of check issuing mechanism; a temporary receiver for the checks from which they are manually removable; a permanent receiver for unremoved checks; a lock for the check issuing mechanism effective when a check is present in the temporary receiver; manipulative means for transferring an unremoved check from the temporary receiver to the permanent receiver; and means for indicating when the manipulative means is operated.

23. In mechanism of the class described, the combination of printing mechanism; means for retaining a record of the operations of the same within the machine; means for receiving similar records adapted to be taken from the machine; and means for indicating on the records retained in the machine those of which the corresponding records have not been removed from the machine.

24. In mechanism of the class described, the combination of accounting mechanism; means whereby a record of the operation of the accounting mechanism is retained in the machine; check issuing mechanism for issuing checks bearing records of the operations of the account mechanism; a temporary receiver, a permanent receiver for checks left in the temporary receiver; means for transferring an unremoved check from the temporary receiver to the permanent receiver; and means operated by the last mentioned means for indicating on the record receiving means retained in the machine those records to which the checks transferred to the permanent receiver correspond.

In testimony whereof I have hereunto set my hand in the presence of two subscribing witnesses.

FRIEDRICH MÜLLER. [L. S.]

Witnesses:
 ALFRED HENKEL,
 WALTER VANNEGUS.